(No Model.)

G. F. VOESTER.
ANIMAL TRAP.

No. 334,096. Patented Jan. 12, 1886.

WITNESSES
W. M. Rheem
David A. Mead

INVENTOR
Gottlob F. Voester
By W. E. McIntire
Attorney

United States Patent Office.

GOTTLOB FRIEDRICH VOESTER, OF POMONA, CALIFORNIA.

ANIMAL-TRAP.

SPECIFICATION forming part of Letters Patent No. 334,096, dated January 12, 1886.

Application filed July 28, 1885. Serial No. 172,889. (No model.)

*To all whom it may concern:*

Be it known that I, GOTTLOB F. VOESTER, a citizen of the United States, residing at Pomona, California, have invented new and useful Improvements in Animal-Traps, of which the following is a specification.

This invention relates to animal-traps, and particularly to that class used in catching gophers, squirrels, &c., though the form of trap may be used with advantage in traps for larger animals. Heretofore traps of this description have been too expensive to admit of their extensive use, and as, for the purpose for which my traps are particularly designed—use in newly-planted fields—a very large number should be employed, it is, first, my object to produce a trap which shall be capable of being produced at a minimum cost; and, further, the object is to produce a trap provided with a trigger of new and advantageous form, by which the jaws are set and released.

With these objects in view my invention consists of a trap whose main body portion, comprising the actuating-spring, retaining-jaws, &c., is made of one piece of metal; and, further, the invention consists of a trigger adapted to be placed between the jaws of the trap to hold them apart until the same is displaced, the said trigger and that part of the trap upon which it rests being so formed as to secure a very delicate bearing, in order that the trap may be sprung when the trigger is touched, however lightly, all substantially as will now be described.

In order that those skilled in the art to which my invention relates may be able to make the same and thoroughly understand its advantages, I will now proceed to describe the same in connection with the accompanying drawings, in which—

Figure 1:
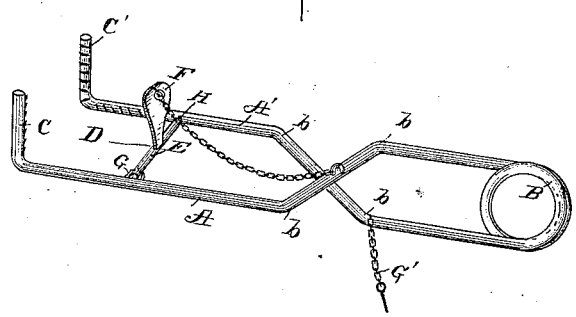
Figure 2:

Figure 1 is a perspective view of the trap, the same being shown as set and ready for use, the seat for the trigger on one jaw and the point which enters the opposite jaw being shown in dotted lines. Fig. 2 is a view showing the under side of the cross-piece which holds the jaws apart.

In the drawings, A A' represent the jaws of the trap, which are each provided on their inner edges with teeth, so as to prevent the slipping and escape of anything that may be grasped between them. B represents the spring, which constantly exerts a strain to bring the jaws together. The entire trap is made of a single piece of spring metal, preferably steel wire, of sufficient size and strength to form a spring of adequate force to bring the jaws together firmly enough to securely grasp any body which may be between them when the trigger, which holds them apart, is displaced.

In making the traps the wire is first cut into pieces of the length required to make a trap, and is wound once around a mandrel, thus forming the spring portion B, the arms are given the bends $b$ $b'$, which are of such a form as to overlap each other, and, finally, the ends C C' are bent up at right angles. These upturned ends are carefully formed, so that they will bear squarely against each other when the separating pin or trigger is removed. Thus the resiliency of the spring may be allowed to exert itself without danger of the parts becoming displaced.

In order to secure a means of holding the jaws apart when the trap is set, which may be displaced by the lightest touch from any direction, I provide the T-shaped stop or trigger D. This is made up of the lower cross-piece, E, and the pin portion F, set in the middle of the said cross-piece.

G represents a square projection placed upon the inner face of the jaw A, and H is a countersink in the opposite jaw.

Fig. 2 is a view showing the under face of the cross-piece E. One end is cut away to form the part I, which is of about half the thickness of the main part of the pin. The shoulder formed by this cutting away is sharpened to form a point, J, which bears against the shoulder G when the trap is set. When the parts are in place, the flat portion I rests upon the top of the shoulder G, and any backward or forward motion of the pin F will raise the central point, J, from the shoulder and allow the spring to exert itself to push the pin out of place. The trigger is attached to the main body of the trap by means of a chain, L, secured to the pin F at one end and to the trap at any suitable point.

The trap is prevented from being dragged by the animal which may be caught therein by means of a chain, attached at any suitable point to the trap and to a peg driven into the ground.

Having thus described my invention, what I claim as new, and desire to secure by Letters Patent, is—

1. In combination with the jaws of an animal-trap, the trigger, consisting of the pin provided at one end with the point, with the sharpened shoulder at the other, and the upward-extending pin, substantially as described.

2. As a new article of manufacture, an animal-trap made of one piece of metal, bent to form the spring B and the jaws, as described, and the trigger, provided at one end with the point and at the other with the pointed shoulder.

In testimony whereof I have hereunto set my hand in the presence of two subscribing witnesses.

GOTTLOB FRIEDRICH VOESTER.

Witnesses:
GEORGE PFEIFFER,
JOHN H. KING.